Nov. 13, 1962 O. A. VIELI 3,063,952
METHOD OF MAKING A SYNTHETIC RESIN FOAM BY FORCING MATERIAL
THROUGH A MICROPOROUS STRUCTURE
Filed Sept. 9, 1958
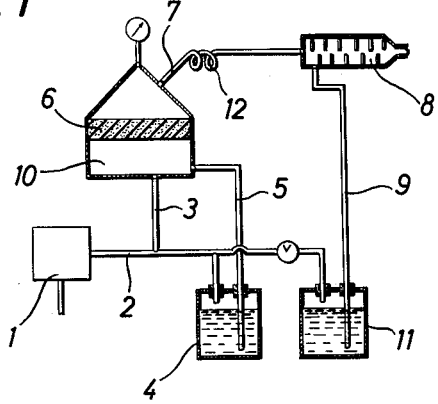
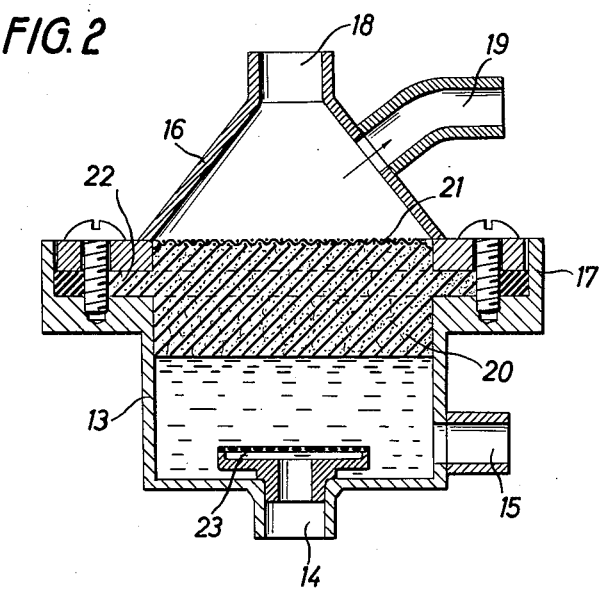
INVENTOR:
Otto Anton Vieli
BY Mestern and Kollin
Attorneys

3,063,952
METHOD OF MAKING A SYNTHETIC RESIN FOAM BY FORCING MATERIAL THROUGH A MICROPOROUS STRUCTURE

Otto Anton Vieli, Rhaezuens, Switzerland, assignor to Dr. Werner H. Kreidl, % Stroock & Stroock & Ravan, New York, N.Y.
Filed Sept. 9, 1958, Ser. No. 760,030
Claims priority, application Germany Sept. 12, 1957
6 Claims. (Cl. 260—2.5)

It is known that foamable synthetic resin solutions may be foamed either by pneumatic or mechanical means and that by the addition of resin hardeners the foam may be solidified.

Pneumatically and mechanically produced coarse foams may be transformed into fine foams by forcing them through long-drawn screens or nozzles.

The object of the present application is a method and equipment for the continuous production of rigid but wet synthetic resin foams in constant, uniform fineness, characterized by the fact that foamable solutions together with a gaseous medium are forced through a fine-pored elastic body, e.g. a sponge-like material and that the resulting foam is transformed into a rigid wet foam by the addition of a synthetic resin hardener. The manufacture of rigid foams according to this original process is carried out with equipment also included in the object of this present application.

FIG. 1 is a diagram of the apparatus, FIG. 2 shows a section of a fine-pored elastic body arranged in its housing.

The diagrammatic arrangement of equipment suitable for the manufacture of rigid synthetic resin foams shown in FIG. 1 comprises a compressor 1 connected to the pre-foamer 10 by pipes 2 and 3 via the socket 0 and to a pressure chamber 4 containing a foam agent solution in which the synthetic resin may already be dissolved. By means of the gas pressure produced in compressor 1 the foam agent/synthetic resin solution is forced through pipe 5 into the pre-foamer 10 in which there is an elastic frit 6 as foam producing medium. The pulsating strokes of the compressor force the solution together with the pressure gas fed from pipe 3 through this elastic frit 6 which in its turn under the influence of the compressor strokes periodically suffers elastic deformation which considerably promotes the generation of foam. The coarse or pre-foam thus produced is fed through pipe 7 to a mixing device 8; pipe 9 feeds this device with a catalyst to induce hardening. The feeding of this hardening solution also proceeds under the pressure gas produced by the compressor in pressure chamber 11. Between the foam generator 10 and the mixing device 8, a screen 12, e.g. a long-drawn nozzle of relatively narrow cross-section may be arranged which results in improvement or refining of the foam.

The foamer in diagram 2 comprises a housing 13 provided with a feeder socket 14 for the admission under pressure of a gaseous medium and in inlet 15 for the feeding of the foam agent solution. To the top of housing 13 is screwed a conical cover 16 by means of a flanged joint 17. Cone 16 is provided with a socket 18 for a manometer and a nozzle 19 for the outlet of the fine foam. On a level with flange 17 is frit 20 which on the upper side fits against a wire grid. This frit is clamped into the flange connection at 22. It consists for example of a fine-pored elastic sponge-like material such as neoprene. As may be seen from the diagram, frit 20 at the upper end is flush with the wire grid 21 whereas the lower surface is free and movable. In this manner the elastic frit is capable of longitudinal pulsation in a perpendicular direction. Above socket 14 is a grid 23 which can produce a pre-foaming of the foam agent solution flowing in through inlet 15.

During operation compressor 1 generates an overpressure of about 6-8 atmospheres into the frit 6 and the space below it. As the compressor produces this pressure in thrusts (e.g. with a frequency of 20-35 cycles), frit 6 performs mechanical pulsations i.e., it becomes compressed in the pressure phase and relaxed between two pressure phases. It must be assumed that the fine foam emerging from frit 6 is largely produced by this pulsation, the foam being ejected during the pressure phase and new foam agent solution being aspirated during the relaxed phase. The total pressure difference is preferably at frit 6, however the space immediately above the frit should be under sufficient pressure to ensure the expulsion of the foam. In principle there are two ways in which the process may be carried out. First, pipe 5 and feeder socket 2 may merely feed the foam agent solution, e.g. an alcohol sulphonate whilst the synthetic resin solution, e.g. a liquid carbamide resin is fed to the already foamed foam agent. Secondly, there is the possibility of feeding a mixture of foam agent and synthetic resin solution directly through pipe 5.

If no compressor is available as the pressure source, the frit can be made to pulsate by other means. There is, for instance, the possibility of inducing vibration of the lower surface of the frit by electro-magnetic means. By the frequency of these vibrations the quality of the foam, i.e. the number of pores per unit volume can be considerably influenced.

As material for frit 6 which should preferably have a porosity of between 5,000 and 50,000 pores per cubic centimeter any substance possessing the aforementioned properties may be used. In practice, a frit made from isocyanate-polyester combinations has proved very efficient. As frit, in place of an elastic material, i.e. a foam-like body, a fine-meshed net or a pack of meshed nets may serve equally as well.

It has further been shown that for the continuous and smooth generation of rigid synthetic resin foams the construction or form of the long-drawn nozzle serving as foam refining device is of considerable importance.

The process of transformation which goes on inside the tube producing the fine foam is not, as yet, completely clear. It has been shown that with the use of foam pipes of circular section, a certain minimum ratio between length and diameter must be observed according to the type of coarse foam, its chemical composition, its liquid content and the propelling pressure into the foam pipe. Failing this the foam skeleton is detrimentally influenced or even destroyed. For example, for urea formaldehyde foams it has been found that when feeding into the foam pipe under a pressure of about 4 atmospheres a ratio of foam-pipe length to inside diameter of 1000:3 is unsuitable. If the foam pipe measures 1000 mm. in length the inside diameter must be greater than 3 mm., i.e. the cross-section area must be greater than 10 mm.$^2$ if the desired jet effect is to be obtained. With an unfavorable ratio between length and diameter, at the exit of the jet-like acting foam pipe instead of usable fine foam emerging either a substance compressed to a creamy liquid is expelled or the foam emerges in spurts.

On the other hand, a foam pipe of inside diameter of about 8 mm. and circular cross-section, with a length of 10 m. and which has the reaction of a long-drawn nozzle is quite serviceable and delivers a very compact fine foam. The length of the foam pipe should always be greater than 100 times the largest inside diameter.

A simple trial with the coarse foam in hand will easily determine the most favorable cross-section of the long-drawn jet-like acting foam pipe. The length of the jet pipe in this case is not particularly critical. In the example give above the length of the foam pipe can, without detriment, be reduced from 10 m. to ½ m. or extended to 20 m.

Of no little importance is the mixing device, also an integral part of the invention; over and above the feeder pipe 9 shown in diagram 1, it may have further connections for the feeding of filling substances to permit the production of multi-component foams according to the methods described in our application. In principle this mixing device could be provided with a stirring mechanism which, however, would complicate the apparatus and make it unwieldy, particularly so, if the mixing device is also intended to place the foam produced, in a slightly jellied condition, direct at the final location of use. Moreover, experience has shown that stirring mechanisms do not just mix the foam with the other substances added, but partly destroy the foam.

It has been found that the mixing of foam with hardener and filling substances can be achieved in an elegant manner without the use of mechanically moved parts by providing the mixing device with a braking system which subdivides the mixing chamber into a large number of long-drawn jets. Particularly suitable as a braking device has been found an arrangement which subdivides the cylindrical mixing chamber in cross-section into sector-like channels; the radii of the circle sectors are smaller than the radius of the mixing chamber cross-section. The best results are obtained when the braking device which forms those sectors is so developed that the edges touching the walls of the mixing chamber are not parallel to the axis of the mixing chamber but arranged disc-like around it. In the further development of this particular braking system it is of advantage that the spiral line should not be continuous but interrupted periodically by cylindrical parts which are smaller in diameter than the mixing tube.

In this manner it is possible with the addition of the hardener as indicated, to obtain a fine foam so intimately mixed that a homogeneous synthetic resin foam of fine-foam structure in the hardening phase is delivered. For instance, fine foams were produced containing more than 100,000 pores/cm.$^3$ with a density of 20 kgs./m.$^3$ in the moist phase, that is 3–5 kg./m.$^3$ in the dry phase.

What I claim is:

1. In a method for the manufacture of a synthetic resin foam, the steps comprising forcing at least a solution of a foaming agent, together with a gas, through a resilient body of micro-porous sponge-like structure, thereafter mixing the foam thus obtained with at least a solution of a hardening agent for said resin.

2. A method for the manufacture of a synthetic resin foam, which comprises forcing a solution of a foaming agent, together with a gas, through a resilient body of micro-porous sponge-like structure while said body is subjected to pulsations, thereafter mixing the foam thus obtained with a solution of the synthetic resin to be foamed and a hardening agent for said resin.

3. A method for the manufacture of a synthetic resin foam, which comprises forcing a solution of a foaming agent, together with a solution of the synthetic resin and a gas, through a resilient body of micro-porous sponge-like structure, thereafter mixing the foam thus obtained with a solution of a hardening agent for said resin.

4. A method for the manufacture of a synthetic resin foam, which comprises forcing a solution of a foaming agent, together with a solution of the synthetic resin and a gas, through a resilient body of micro-porous, sponge-like structure while said body is subjected to pulsations, thereafter mixing the foam thus obtained with a solution of a hardening agent for said resin.

5. A method for the manufacture of a synthetic resin foam, which comprises foaming a solution of a foaming agent to a coarse foam, forcing said coarse foam through a resilient body of a micro-porous sponge-like structure, and mixing the fine foam thus obtained with a solution of the synthetic resin and a hardening agent for said resin.

6. A method for the manufacture of a synthetic resin foam, which comprises foaming a solution of a foaming agent to a coarse foam, forcing said coarse foam through a resilient body of a micro-porous sponge-like structure, while said body is subjected to pulsations, and mixing the fine foam thus obtained with a solution of the synthetic resin and a hardening agent for said resin.

References Cited in the file of this patent

UNITED STATES PATENTS

| | | |
|---|---|---|
| 2,076,295 | Curs et al. | Apr. 6, 1937 |
| 2,559,891 | Meyer | July 10, 1951 |
| 2,653,801 | Fontein et al. | Sept. 29, 1953 |
| 2,673,723 | Keen | Mar. 30, 1954 |
| 2,813,780 | Vieli | Nov. 19, 1957 |
| 2,859,018 | Wakeman et al. | Nov. 4, 1958 |
| 2,861,963 | Butsch | Nov. 25, 1958 |
| 2,881,141 | Smythe | Apr. 7, 1959 |

UNITED STATES PATENT OFFICE
CERTIFICATE OF CORRECTION

Patent No. 3,063,952                          November 13, 1962

Otto Anton Vieli

It is hereby certified that error appears in the above numbered patent requiring correction and that the said Letters Patent should read as corrected below.

In the heading to the printed specification, line 9, for "Claims priority, application Germany Sept. 12, 1957" read -- Claims priority, application Switzerland Sept. 12, 1957 --.

Signed and sealed this 3rd day of September 1963.

(SEAL)
Attest:

ERNEST W. SWIDER
Attesting Officer

DAVID L. LADD
Commissioner of Patents